Nov. 10, 1959   B. E. HOUSE   2,912,068
EXPANDING WHEEL TYPE BRAKE
Filed May 22, 1953   5 Sheets-Sheet 1
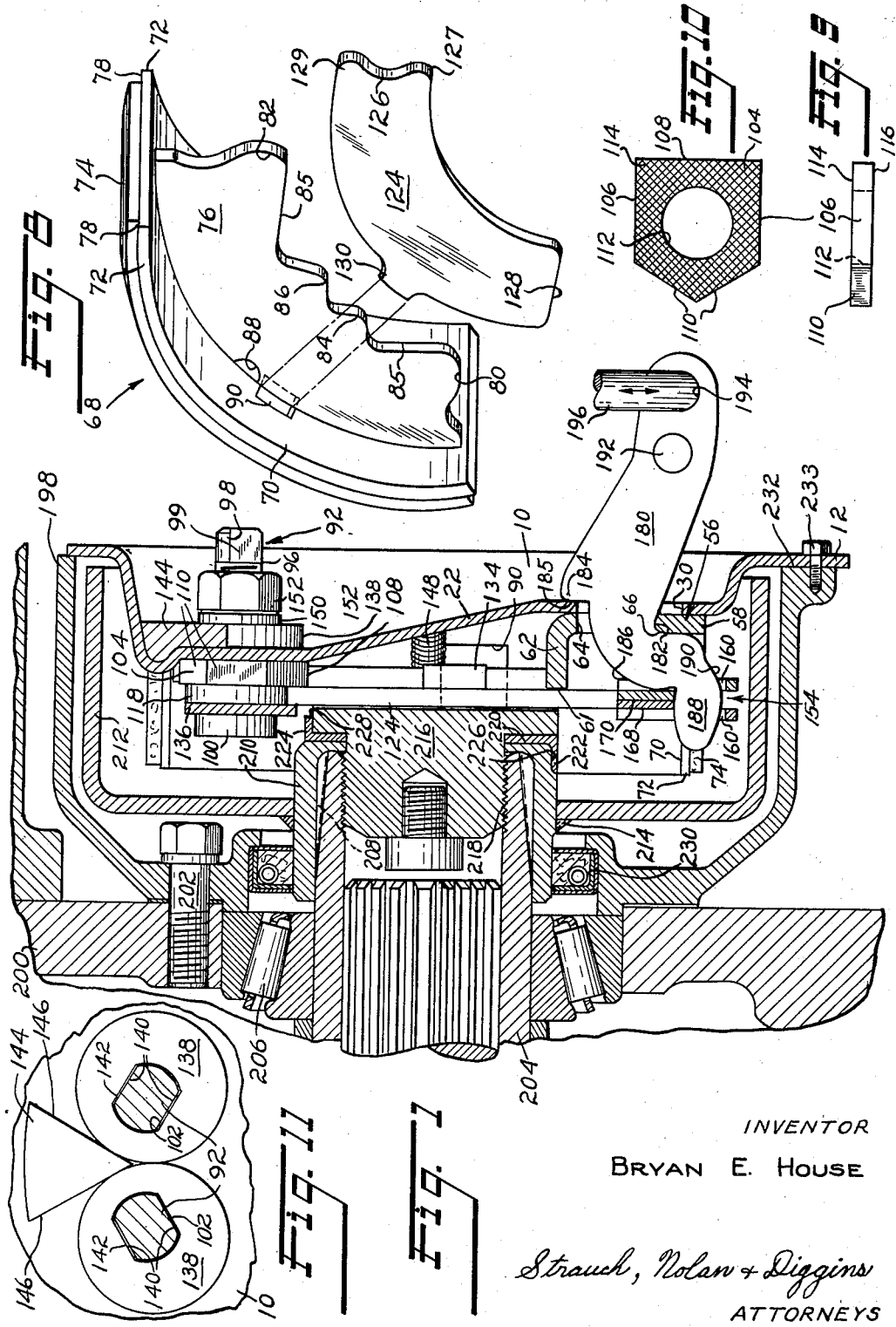
INVENTOR
BRYAN E. HOUSE
Strauch, Nolan & Diggins
ATTORNEYS Nov. 10, 1959 B. E. HOUSE 2,912,068
EXPANDING WHEEL TYPE BRAKE
Filed May 22, 1953 5 Sheets-Sheet 2
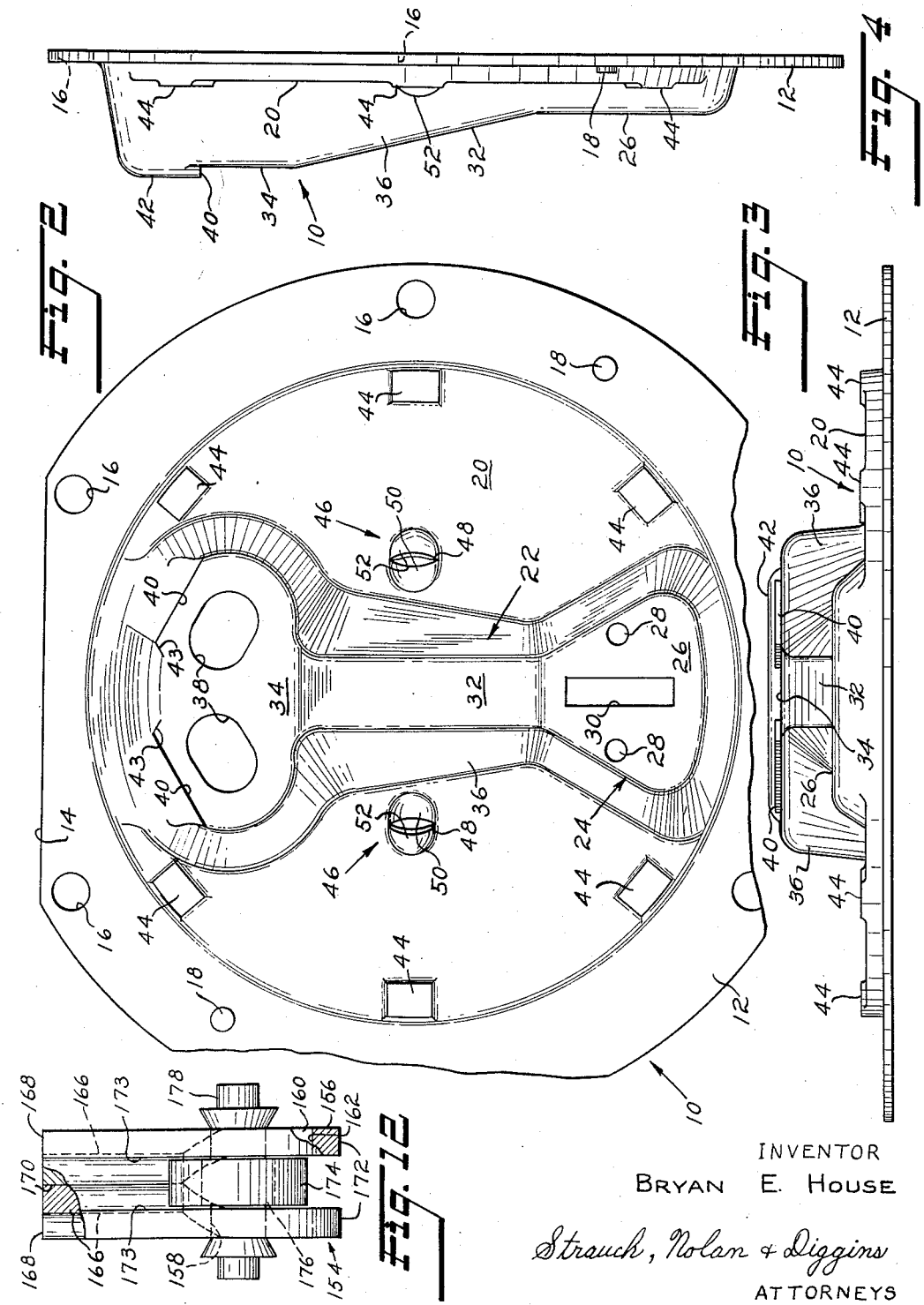
INVENTOR
BRYAN E. HOUSE
Strauch, Nolan & Diggins
ATTORNEYS Nov. 10, 1959  B. E. HOUSE  2,912,068
EXPANDING WHEEL TYPE BRAKE
Filed May 22, 1953  5 Sheets-Sheet 3
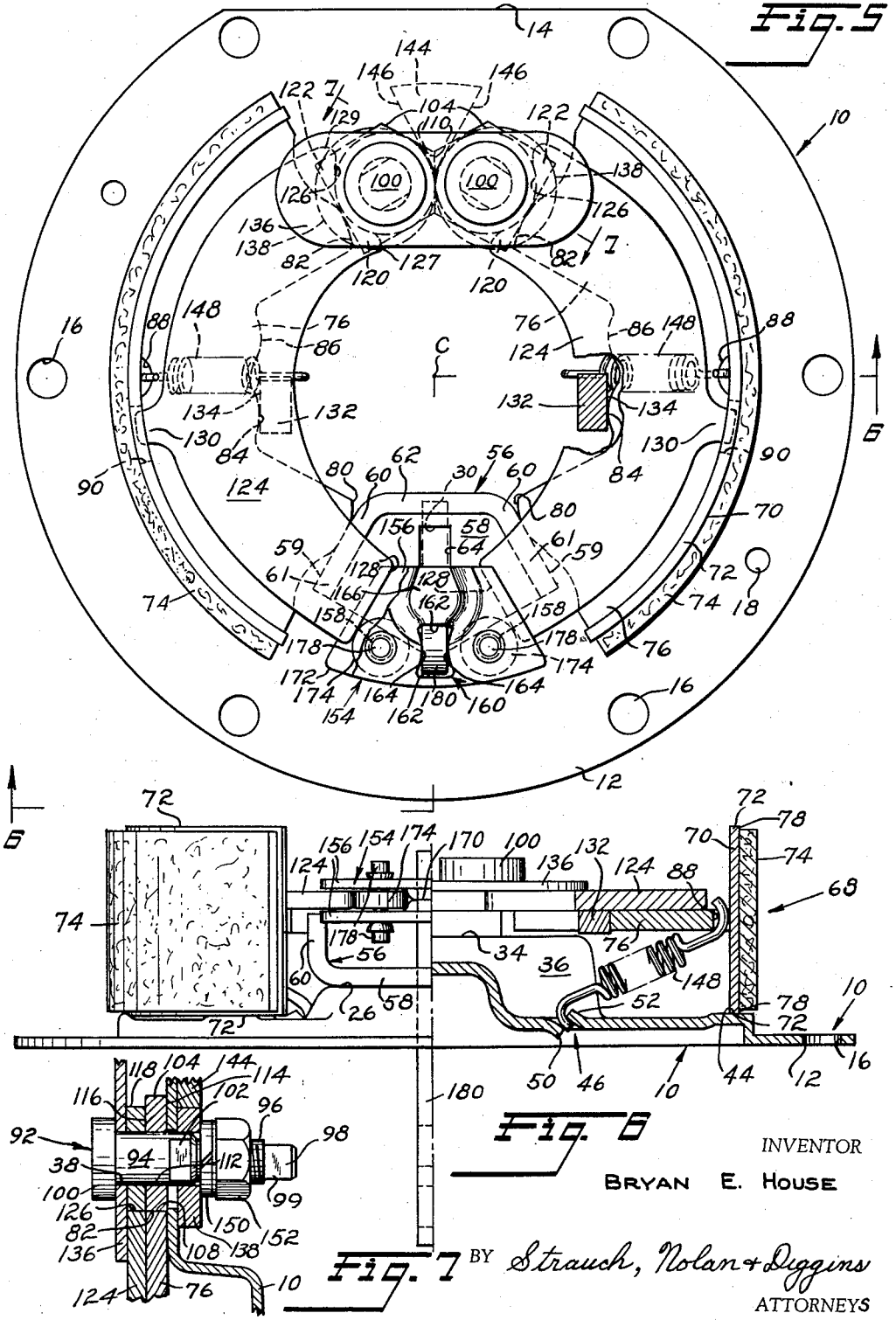
INVENTOR
BRYAN E. HOUSE
BY Strauch, Nolan & Diggins
ATTORNEYS

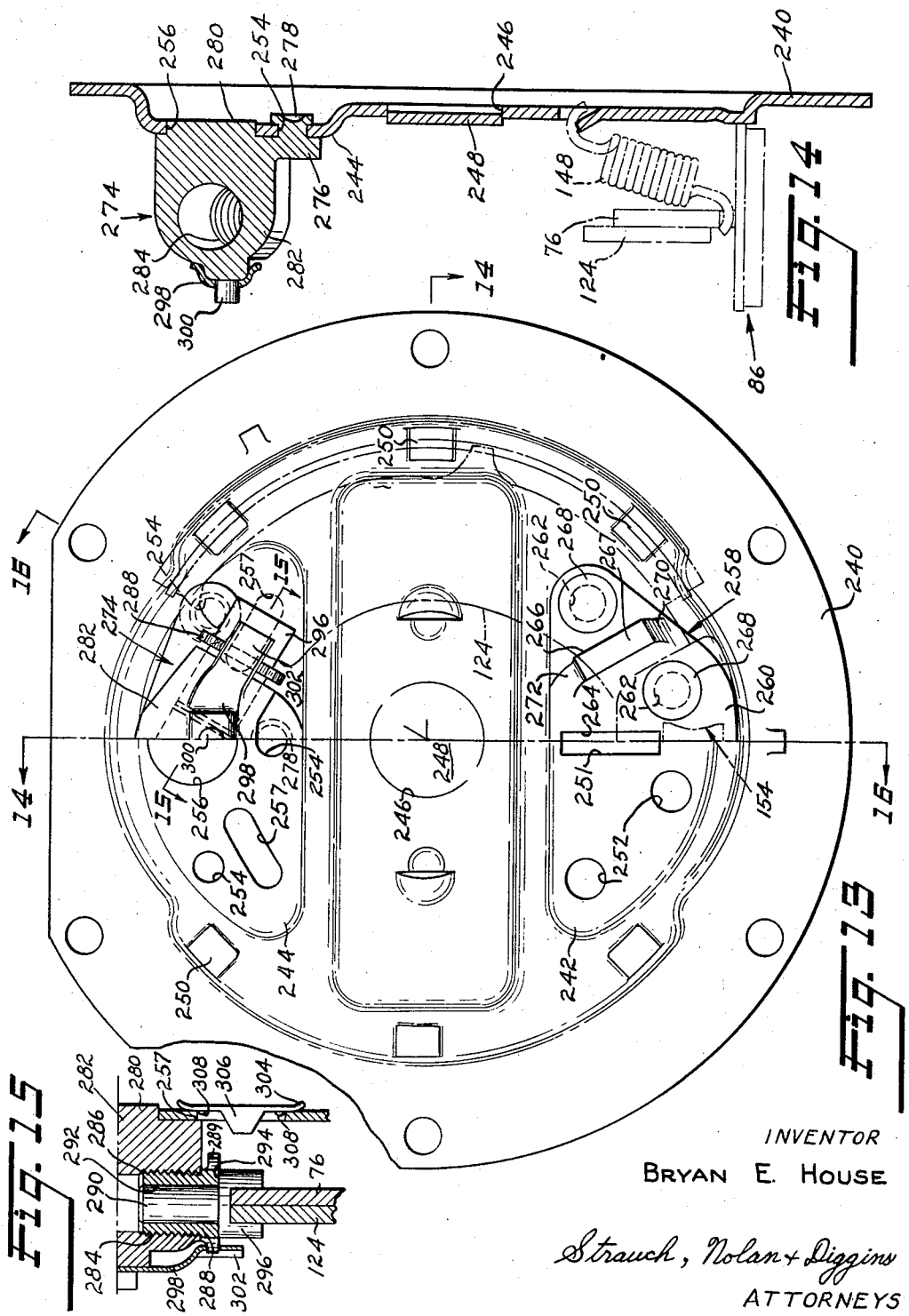

Nov. 10, 1959   B. E. HOUSE   2,912,068
EXPANDING WHEEL TYPE BRAKE
Filed May 22, 1953   5 Sheets-Sheet 5
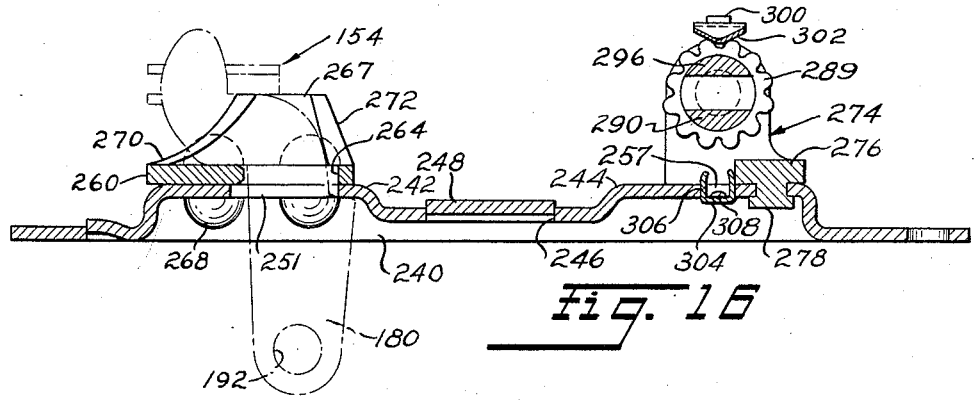
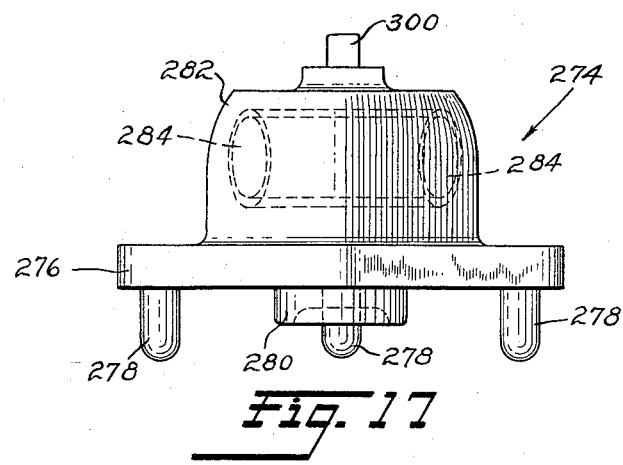
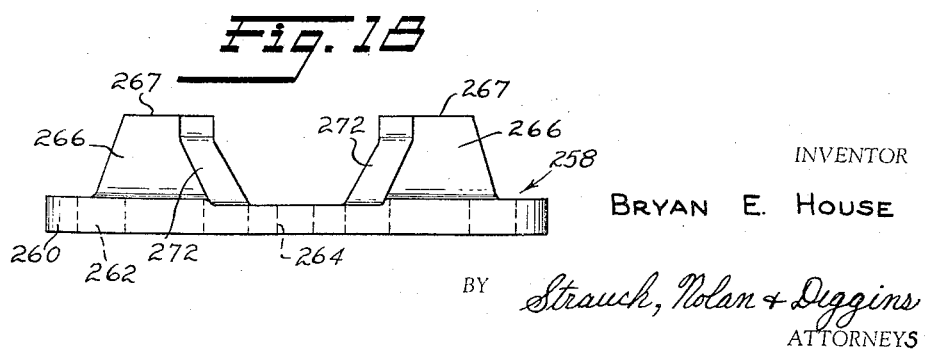
INVENTOR
BRYAN E. HOUSE
BY Strauch, Nolan + Diggins
ATTORNEYS

United States Patent Office 2,912,068
Patented Nov. 10, 1959

2,912,068

EXPANDING WHEEL TYPE BRAKE

Bryan E. House, Ashtabula, Ohio, assignor, by mesne assignments, to Rockwell-Standard Corporation, a corporation of Pennsylvania Application May 22, 1953, Serial No. 356,644

9 Claims. (Cl. 188—78)

This invention relates to vehicle brake mechanisms and more particularly to manually operated wedge actuated brakes of the internally mounted expanding shoe type.

Conventional brake mechanisms of the type embodying inner and outer brake shoes for gripping an intermediately disposed rotating drum, and the type comprising a pair of internally disposed expanding shoes for braking engagement with the rotating drum have been used, and are being constantly improved. The constant increase in size and power of present day vehicles and the increasing demand for greater braking efficiency have resulted in an appreciable increase in the size of these conventional brake mechanisms. Such increases in size have resulted in further vehicle design problems and have also resulted in brakes which are unduly heavy, costly to manufacture, and difficult to repair.

The present invention contemplates a brake of the internally expanding shoe type wherein size, weight and mechanical complexity are minimized with sacrifice of braking efficiency. It incorporates a pair of relatively free floating brake shoes that are equally self energizing in both forward and reverse, and means for applying equal and maximum braking force to each brake shoe through a novel self-adjusting actuating mechanism. Each brake shoe is individually adjustable from exteriorly of the brake housing, and the assembly embodies certain novel details of construction which permit fabrication of the brake by well known processes of punching and stamping which materially lower the cost of manufacture.

It is therefore the major object of the invention to provide a novel brake mechanism which is inexpensive to manufacture and assemble and embodies a novel and efficient relation between the various parts.

Another object of this invention is to provide a novel brake mechanism backing or supporting plate that is simply and completely fabricated by stamping a sheet metal blank which requires no further manufacturing operations.

Another object of this invention is to provide a novel enclosed brake mechanism and backing plate assembly wherein the brake shoe adjustments are made from the exterior side of the plate.

A still further object of the invention resides in the provision of an improved brake mechanism of the character indicated of such compact arrangement that brakes of adequate size and capacity may be fitted into limited spaces available on heavy duty vehicles.

It is another object of this invention to provide a novel relation between brake actuating levers and the actuating means therefor, to insure the equal transmission of braking forces through said levers to the respective brake shoes, regardless of different adjustments of the individual brake shoes.

Still another object of the invention is to provide for novel alignment and support of the brake shoes and levers by special support faces or pads on the brake mechanism backing plate.

A still further object of this invention is to provide novel adjustment means for individually adjusting each brake shoe.

A further object of this invention is to provide novel wedge actuating means for applying equal braking force to each brake shoe regardless of the difference in adjustment of the brake shoes.

Another object of this invention is to provide a novel coupling between a control lever and brake actuating means operated thereby to prevent binding therebetween because of unequal adjustment of the individual brake shoes.

A further object of the invention is to provide a novel brake mechanism wherein a mechanical actuator disposed between the adjacent ends of two pivoted brake shoe assemblies is chiefly supported on an operating lever therefor.

Still another object of this invention is to provide novel single retracting springs for each brake shoe which urge the shoes diagonally inwardly and exert a force downwardly holding the shoes in sliding contact with the brake backing plate and eliminating the need of any brake shoe hold-down means.

These and other objects will become apparent from the following description and appended claims when read in connection with the attached drawing, wherein:

Figure 1 is a partial vertical sectional view of the novel brake showing the rotating shaft, brake drum, and backing plate assembly;

Figure 2 is a plan view looking at the inner face of the brake backing plate;

Figure 3 is an end elevational view of the brake backing plate looking from the bottom of Figure 2;

Figure 4 is a side elevational view of the brake backing plate looking from the left hand end of Figure 2;

Figure 5 is a plan view similar to Figure 2 but showing the associated brake mechanism elements such as brake shoes and actuating levers in their assembled positions on the backing plate;

Figure 6 is a partial sectional view taken substantially along the line 6—6 of Figure 5 showing the arrangement of the brake shoe return spring;

Figure 7 is a partial sectional view taken substantially along the line 7—7 of Figure 5 showing the details of the brake adjustment pin and cam assembly;

Figure 8 is a perspective exploded view of a brake shoe and associated actuating lever;

Figure 9 is an end elevational view of a brake shoe abutment block;

Figure 10 is a bottom plan view of the brake shoe abutment block showing the knurled gripping face;

Figure 11 is a fragmentary rear view illustrating the brake adjustment cams;

Figure 12 is an end elevational view of the brake actuating wedge assembly;

Figure 13 is a plan view of a further embodiment of the invention showing a modified backing plate with a partial showing of a modified abutment bracket and adjustment means mounted thereon;

Figure 14 is a sectional view taken substantially along the line 14—14 of Figure 13 showing the method of mounting the adjustment housing and showing a brake shoe assembly and return spring in phantom lines;

Figure 15 is a sectional view taken substantially along the line 15—15 of Figure 13 showing the details of the adjustment means;

Figure 16 is a sectional view taken substantially along the line 16—16 of Figure 13 showing the modified abutment bracket and adjustment means, and showing the relation of the control lever and actuating wedge in phantom lines;

Figure 17 is an elevational view of the novel adjustment means mounting housing; and Figure 18 is an elevational view of the novel abutment bracket.

For purposes of illustration the brake assembly of the invention will be described in its preferred embodiment as associated with a constantly rotating transmission output shaft in a vehicle.

With continued reference to the drawings, numeral 10 generally designates a novel brake mechanism backing plate or support member upon which the movable brake shoes and associated brake shoe actuating elements are mounted. As illustrated in Figures 2, 3 and 4, plate 10 is an integral sheet steel stamping drawn and punched to the desired configuration during fabrication so as to require no further machining operations during assembly or installation.

Backing plate 10 comprises a flat peripheral flange 12 having a chordal segment removed to form a top straight edge 14, for purposes of clearance. A plurality of equally spaced apertures 16 and diametrically opposed dowel pin holes 18 are punched in flange 12 for securing and locating, respectively, the backing plate to a brake housing, as will be more fully described in explaining assembly of the brake.

Backing plate 10 is formed, during fabrication, with a generally raised surface 20 circumscribed by and substantially parallel to flange 12. Surface 20 is in turn bisected by a further raised surface or embossment, generally indicated by numeral 22. One end of embossment 22 is of substantially triangular configuration, as indicated at 24, having a smooth flat upper surface 26 substantially parallel to flange 12 and provided with spaced dowel openings 28 disposed on opposite sides of rectangular control lever accommodation slot 30. Upwardly sloping rib or surface 32 extends from the apex of triangular portion 24 to further flat elevated surface 34 also disposed in substantially parallel relation to flange 12. Surface 26, rib 32 and surface 34 are all connected to elevated surface 20 by continuous curved sloping surface 36, as illustrated in Figures 3 and 4.

Spaced elongate or elliptical adjustment pin openings 38 are punched in surface 34 with their major axes disposed at an angle of approximately 60 degrees to a plate diameter through the center of slot 30 (Figure 2). Raised flat guide surfaces 40 on projection 42 extending perpendicularly from surface 34 are spaced from and are parallel to the major axes of elliptical openings 38 and are provided at their respective inner ends with inwardly directed similarly raised abutment surfaces 43 disposed at an angle of approximately 120° to the respective guide surfaces 40.

As shown in Figures 2, 3 and 4, elevated surface 20 extends between the inner periphery of flange 12 and continuously curved surface 36. Adjacent the inner periphery of flange 12, surface 20 is provided with two groups of three integrally raised pads 44 disposed in equal circumferentially spaced relation on opposite sides of embossment 22. These pads which serve as brake shoe support or bearing surfaces have upper flat surfaces which are preferably hardened to withstand wear, and are disposed substantially in the same plane and lie parallel to flange 12.

Spaced diametrically opposed brake spring anchor apertures 46 are also formed in surface 20 during the fabrication of backing plate 10, and are located on a centerline normal to a longitudinal centerline through embossment 22. Apertures 46 are formed by slitting surface 20 along line 48 and then forming one side of the slit downwardly as at 50 and the opposite side of the slit upwardly as at 52, as shown in Figure 6.

It will be readily seen from the drawings and the foregoing description that the novel backing plate or support member 10 with its associated bearing surfaces, supporting surfaces and mounting apertures is a one piece integral unit which can be easily and inexpensively formed by well known drawing and punch operations. It will also be readily apparent from the following description that no further fabrication procedures are necessary and that the brake shoes and associated actuating elements are readily and easily assembled to the backing plate and form a compact and easily serviced brake unit.

Turning now to Figures 1 and 5, for construction and operation of the novel brake, an abutment bracket, generally indicated at 56, is drawn from sheet steel having a generally pentagonally shaped base 58 with integral dowel projections (not shown) extending downwardly therefrom for mounting engagement with dowel openings 28 in surface 26. Bracket 56 is welded or otherwise suitably rigidly secured to plate 10. Integral sides 60 extending perpendicularly upwardly from base 58 are each disposed at an angle of approximately 30 degrees to a vertical centerline of Figure 5, and merge into and are integral with upstanding side 62. Each bracket side 60 has a flat outer brake shoe abutment and side face 59 that is disposed at about 30° to a vertical diameter through Figure 5, and as shown in Figure 1 the edges of bracket sides 60 remote from base 58 are flat and define coplanar slide support faces 61 for the brake actuating levers. Faces 61 are parallel to surfaces 44 and normal to the axis of the drum. Base 58 is provided with rectangular slot 64 which aligns with control lever slot 30 when bracket 56 is mounted on surface 26. As shown in Figure 1, slot 64 is not as long as slot 30 so that beveled edge 66 overhangs slot 30 to provide a fulcrum point for a control lever, to be later described.

Figure 8 illustrates a brake shoe 68 having a relatively wide arcuate rim 70 having flat smooth parallel longitudinal side edges 72. Brake lining 74 is secured to the outer arcuate face of rim 70 in a suitable manner, and a transversely extending flat web 76 is rigidly secured to the inner arcuate face of rim 70, as by welding, midway between edges 72. The overall width of rim 70 is greater than lining 74 so that when the lining is exactly centered on and secured to the rim there is an exposed portion 78 of the rim along each longitudinal edge of lining 74 for a purpose which will become apparent.

As shown in Figures 5 and 8, the opposite inner edges of web 76 are smoothly curved to form end abutment contacting fulcrums 80 and 82 which are hardened to resist excessive wear. The inner periphery of web 76 slopes inwardly from the fulcrums as at 85 and merges with spaced rounded lever contacting fulcrums 84 and 86 disposed an equal distance on either side of a horizontal centerline through Figure 5. Fulcrums 84 and 86 are also surface hardened to resist wear. Notch 88, located on a centerline between fulcrums 84 and 86, is cut from the outer periphery of web 76 to provide a brake spring anchor. Slot 90 is cut in the inner face of rim 70 to one side of notch 88 in radial alignment with fulcrum 84 and extends an equal distance on both sides of web 76, which permits the brake shoe to be interchangeably mounted on either side of embossment 22, as will be hereinafter explained.

A brake shoe 68 is mounted on each side of embossment 22 with a flat smooth longitudinal edge 72 of each assembly resting on the upper surfaces of a respective group of three support pads 44 (Figure 6) and having a fulcrum 80 slidably abutting the flat inclined face 59 of a respective side 60 of fixed bracket 56 (Figure 5).

Similar brake adjustment pins 92 each having in succession an elongated shank comprising smooth cylindrical portion 94, a smaller diameter integral threaded portion 96, and a still smaller diameter cylindrical end shank 98 formed with diametrically opposed milled flats 99, extend through and are mounted for adjustable sliding movement along elliptical openings 38 in plate 10. The diameter of pin portion 94 is about equal to the minor axis of opening 38 so as to be slidably received therein, and enlarged flat head 100 on the pin engages the outer side of retainer plate 136 as shown in Figure 7.

Brake shoe abutment blocks 104, illustrated in Figures 9 and 10, are formed from sheet steel of slightly greater thickness than web 76 and are surface hardened to maintain good wearing qualities. Abutment blocks 104 are formed in a substantially pentagonal configuration having opposite straight parallel sides 106, a straight base 108 and merging equally inclined straight sides 110. An abutment block 104 is mounted on each adjustment pin 92 by means of smooth sliding fit of bore 112 on cylindrical portion 94 (Figure 7). The lower face of each abutment block is knurled, as at 114 in Figure 10 to assure frictional contact with surface 34 while the opposite face 116 is smooth to provide a good bearing surface. In the assembly, one edge 106 of each block is in sliding contact with a fixed plate surface 40 which serves to guide the sliding of adjustment pins 92 in a straight line path along elliptical openings 38. At one limit position of adjustment of pins 92, as illustrated in Figure 5, the adjacent inclined edges 110 of the abutment blocks are in contact with each other while a portion of the other inclined edge 110 of each is in contact with a fixed abutment surface 43 on the plate 10. In the assembly each fulcrum 82 of a brake web 76 is in bearing contact with the base 108 of a respective abutment block 104.

Washers 118 (Figure 7) are mounted on cylindrical portion 94 of adjustment pins 92 in bearing contact with smooth surfaces 116 of abutment blocks 104. Washers 118 substantially cover the entire surface 116 of each abutment block 104 but leave a portion of each corner at the juncture of sides 106 and base 108 exposed as indicated at 120 and 122 in Figure 5 to act as support surfaces for brake actuating levers 124.

Brake shoe actuating levers 124 (Figures 5 and 8) having arcuate inner and outer peripheries are mounted in overlying relation to each brake web 76 in the assembly and are supported in spaced relation to the web at one end by the bracket faces 61. Levers 124 are each arcuately curved at the other end, as at 126, to fit in bearing contact with the cylindrical periphery of washer 118 on pin 92 (Figure 7) and terminate in bifurcations 127 and 129 which are slidably supported by exposed portions 120 and 122 of abutment blocks 104. Arcuately curved edge 126 and straight edge 128 both serve as bearing surfaces and are properly hardened to have good wear resistant qualities. The outer periphery of each actuating lever 124 is provided with integral radially outwardly extending lug 130 which is in alignment with and loosely fits into slot 90 of brake shoe rim 70, as shown in Figures 5 and 8. In the assembly straight edges 128 of levers 124 are each disposed at an angle of approximately 30° to a vertical centerline through Figure 5, for a purpose which will become apparent.

A brake web abutment lug 132 having a flat hardened bearing face 134 is welded to each actuating lever 124 but on reversed sides so that the lug 132 on both levers in the assembly will extend downwardly from the under surface of the lever to permit fulcrum 84 and hardened face 134 to be in bearing contact. Lugs 132 are both located below a horizontal centerline as viewed in Figure 5 for purposes of avoiding interference with brake springs, which will be hereinafter described.

An elongated retainer plate 136 having slotted openings therein to permit maximum movement of adjustment pins 92 along openings 38 extends between and is mounted on the cylindrical pin portions 94 between actuating levers 124 and pin heads 100 and serves to retain the actuating levers and brake shoes in assembled relation.

As shown in Figure 11 cams 138 are non-rotatably mounted on adjustment pins 92 on the exterior of backing plate 10 with parallel sides 140 (Figure 11) of off-center opening 142 in contact with milled flats 102, so that rotation of each pin 92 will rotate its associated cam 138.

A triangularly shaped cam bearing block 144 is rigidly secured to the exterior side of backing plate 10, as by welding, and mounted so that inclined sides 146 are disposed an equal distance on opposite sides of a vertical centerline as viewed in Figure 5. Cams 138 abut sides 146, and are held in operative contact therewith by tension springs 148 which have hooks at one end engaging upwardly bent portion 52 of openings 46 in backing plate 10 and hooks in the other ends engaging an edge of notches 88 in webs 76, as shown in Figures 5 and 6. A single tension spring 148 is provided for each brake shoe assembly. The pull of springs 148 urges the curved end portion 126 of each web 76 against washers 118 and consequently urges cams 138 against inclined surfaces 146, an important feature of assembly and adjustment. Lock washers 150 mounted on each adjustment pin are held in place by nuts 152 on threaded portions 96, and when each nut 152 is drawn tight its associated pin 92 is locked rigidly to plate 10.

Referring now to Figures 1, 5 and 12 there is shown the details of the actuating wedge assembly, generally designated at 154. Wedge assembly 154 comprises a pair of substantially truncated triangular metal plates 156 each having two bores 158 disposed on opposite sides of intermediate slot 160, and in respective axial alignment. A slot 160 midway between the bores is provided with parallel ends 162 and opposed inwardly extending convex sides 164 which permit the wedge assembly to cant and prevent uneven braking force, as will become apparent.

Each plate 156 is inwardly depressed at 166, as by die forming, through a portion extending from slot 160 to end 168 of the plates 156. The depression 166 is of sufficient width to provide clearance between wedge 154 and the control lever 180 to permit lateral canting of the wedge for a purpose to appear. Plates 156 are placed together with depressed portions 166 meeting along line 170 and are spot welded together to maintain ends 172 and sides 173 in predetermined spaced relation to accommodate rollers 174 freely rotatably mounted on intermediately enlarged journals 176 of pins 178 which are non-rotatably mounted, as by shear riveting, in bores 158.

Wedge assembly 154 is mounted in diametrically opposed relation to adjustment pins 92, as illustrated in Figure 5, with straight hardened bearing ends 128 of actuating levers 124 extending slidably between sides 173 into bearing contact with the respective free rollers 174. It will be seen that the angular disposition of edges 128 of levers 124 forms a pair of merging inclined planes so that linear movement of the entire wedge assembly 154 on a diameter toward the center of backing plate 10 will cause rollers 174 to ride up inclined edges 128. Since levers 124 are pivotally mounted at their other ends on washers 118 such inward movement of wedge assembly 154 will cause levers 124 to swing outwardly about washers 118 and toward the brake drum against the action of return springs 148.

A control lever 180 extends through plate opening 30 and bracket opening 64 with hardened curved portion 182 engaging the beveled edge 66 as a fulcrum for pivoting for lever 180. Limit stop shoulder 184 extends from the lever 180 (Figure 1) for abutting a surface 185 on backing plate 10 to limit brake release movement of the lever in a counterclockwise direction. A curved portion 186 extends from limit stop 184 to a nose 188 that projects through slots 160 of the wedge assembly 154. Portions 186 and 190 of lever 180 are curved to provide adequate clearance between the ends of slots 30, 64 and 160, respectively, to prevent binding of lever 180 in the slots during operation.

Openings 192 and 194 are provided in the free end of lever 180 for selective connection to linkage 196 connected to a manual control (not shown).

In the assembly, lever 180 is thus pivotally supported by backing plate 10, and the entire wedge assembly 154 is mounted on the end of lever 180 between the ends of levers 124.

As shown in Figure 1, a stationary hollow brake housing 198 is fixed on transmission casing 200, as by bolts 202. The shaft 204 is rotatably mounted in tapered bearing 206 and has a splined end 208 extending into brake housing 198 to mount internally splined adapter 210 and brake drum 212 is rigidly secured, as by weld 214, upon adapter 210 so as to rotate with shaft 204. Cap 216 is mounted in the internally threaded end 218 of shaft 204 and lock washer 220 is disposed between the end of adapter 210 and cap 216. Tabs 222 and 224 of lock washer 220 are oppositely bent and engage milled flats 226 and 228 on adapter 210 and cap 216, respectively, to prevent unloosening of cap 216.

A conventional oil and dust seal 230 is mounted be-between housing 198 and adapter 210, as shown in Figure 1.

Backing plate 10, with the associated brake elements heretofore described mounted thereon, is mounted on housing 198 with flange 12 engaging face 232 of the housing. Dowel pins on the housing 198 (not shown) fit into dowel openings 18 of backing plate 10 to properly locate the backing plate assembly on housing 198. A plurality of bolts 233 extend through openings 16 of backing plate 10 and engage suitable lugs on the periphery of housing 198 for rigidly mounting the backing plate 10 and all of the mechanism thereon upon housing 198 and in correct operating relationship to drum 212. This permits easy access to the brake elements for servicing and replacement, and in the assembly plate 10 protectively covers substantially the entire open end of housing 198.

In operation to apply the brake, force is transmitted through manually operated linkage 196 to move lever 180 clockwise about its pivot point 182 in Figure 1. This causes nose 188 to shift wedge assembly 154 toward the center of the brake, rollers 174 moving along inclined edges 128 of the levers 124 to swing the levers outwardly about the pivotal engagement point of arcuate portion 126 and washers 118. Outward pivotal movement of levers 124 forces the brake shoes 68 radially outwardly, through the rockable sliding engagement of fulcrums 84 with hardened faces 134 of lugs 132, to cause lining 74 to move toward the inner periphery of rotating drum 212, this movement also moving the brake shoe assemblies slightly away from their end fulcrum points. Lug 130 slidably engaging slot 90 serves to maintain alignment of lever 124 during the movement of brake shoe 68.

Outward movement of each brake shoe assembly through force transmitted by lugs 132 and against the tension of spring 148 continues until linings 74 frictionally engage rotating drum 212. The frictional engagement of linings 74 and brake drum 212 results in a circumferential shift of the floating brake shoes to move either fulcrum 80 into contact with side 60 of bracket 56 or fulcrum 82 into contact with base 108 of abutment block 104, depending upon the direction of rotation of the drum. For example, if the drum were rotating counterclockwise as viewed in Figure 5, right hand shoe 68 will shift in the same direction causing fulcrum 82 to tightly abut base edge 108, while left hand shoe 68 will shift in the same direction to cause fulcrum 80 to engage bracket face 61. Slots 90 permit this shift relative to levers 124. The tight engagement between fulcrums 80 and 82 and their respective abutment surfaces and the engagement of lugs 132 with fulcrums 84 assure full and complete braking engagement of lining 74 and drum 212. In reverse rotation of the drum, the converse engagement of the fulcrums and abutment surfaces will be effective to assure equal self-energizing braking by the floating brake assembly.

When brake lever 180 is free to move counterclockwise, wedge assembly 154 is shifted radially outwardly away from the center of the brake assembly by springs 148 swinging the lever and brake shoe assemblies inwardly and out of contact with drum 212.

As shown in Figures 1 and 7 the adjustment pins 92 extend outwardly from the exterior face of backing plate 10 which permits easy adjustment of the brake shoes to compensate for wearing of the linings. A brake adjustment pin 92 is provided for each brake lever and shoe assembly which permits individual adjustment of the shoes.

When it is desired to adjust a brake shoe to compensate for wear, nut 152 is loosened sufficiently to release the grip between knurled face 114 of abutment block 104 and surface 34. With nut 152 loosened, pin 92 is rotated by means of a wrench applied to milled flats 99. Rotation of pin 92 causes unitary movement of eccentric cam 138 which bears on inclined face 146 of block 144 and such rotation infinitely varies the distance between the face 146 and the center of pin 92, within the limits of eccentricity of the cam, with the pin sliding along slot 38 of the backing to its adjusted position. Pins 92 can be rotated in either direction to selectively increase or decrease the distance between the pin center and a respective face 146. Increasing the distance between pin 92 and a respective face 146 will move brake shoe 68 outwardly closer to the brake drum, and decreasing the distance between pin 92 and face 146 will increase this brake shoe clearance. The force exerted by springs 148 on the loosened pin 92 through fulcrum 82 of brake webs 76 always keeps the cam 138 against the respective face 146 and once the adjustment is complete, nut 152 can then be tightened to tightly lock pin 92 in the adjusted position.

Adjustment of the brake shoe assemblies may be unequal which will cause bearing edges 128 of levers 124 to engage rollers 174 at different angles, which will cause wedge assembly 154 to cock. The hour glass configuration of slot 160 formed by convex sides 164 permits the wedge assembly, within the limits of slot 160, to fulcrum or cock laterally of lever 180 without binding on it. This cocking of wedge assembly 154 not only compensates for unequal adjustment of the individual brake shoe assemblies but assures equal braking force being transmitted to each of the actuating levers 124.

It will also be noted that the relation of the wedge assembly 154 and actuating lever 124 is that of a second class lever; that is, force applied by the wedge assembly is transmitted through the full length of levers 124 pivoting about washers 118 to transmit a braking force through abutment lugs 132 mounted approximately at the midpoints of levers 124. The mechanical advantage of this system results in a greater and more efficient braking force being applied.

As shown in Figure 5, springs 148 are attached at one end to notch 88 which is at the geometric center of brake web 76 and anchored at the other end to aperture 46. As a result, each spring 148 is diagonally disposed with respect to backing plate 10 (Figure 6) and exerts a diagonal force on the brake shoe assembly pulling the shoe inwardly and also downwardly to hold edge 72 of each brake shoe assembly in contact with bearing pads 44. Also, since each lever 124 is connected to the shoe by lug 130, the lever is spring urged down onto faces 61. This diagonal force on the brake shoe assemblies eliminates the need for any special brake shoe hold-down means.

Turning now to Figures 13 through 18 there is shown a further embodiment of my brake mechanism, wherein backing plate 240 is an integral sheet steel stamping varying in general configuration from backing plate 10. Backing plate 240 is formed with integral spaced raised pads 242 and 244 and an axial opening 246 which tightly receives knockout plug 248. Also integrally formed on backing plate 240 are raised pads 250 similar to pads 44 for planar support of brake shoe assemblies 68.

A slot 251 and four substantially arcuately disposed holes 252 are punched in pad 242 for mounting an abutment bracket to be described. Pad 244 is also provided with three holes 254, an enlarged hole 256 and a pair of spaced slots 257, each disposed at the same angle to the vertical centerline of Figure 13.

Abutment bracket 258 (Figure 18), similar to bracket 56, is an integrally cast member comprising base 260, having four arcuately disposed openings 262 for registration with holes 252 of pad 242, an actuating lever slot 264, and integral upstanding flat abutment surfaces 266. Rivets 268 passing through holes 252 and 262 rigidly mount bracket 258 on backing plate 240. As in the case of bracket 56, the inclined surfaces 266 of bracket 258 serve as fulcrums for the ends of brake shoe 68, and the brake actuating levers 124 are slidably supported on the upper flat surfaces 267 of bracket 258. The bracket sides are arcuately curved as at 270 and have their opposite edges disposed at an angle as at 272 to assure proper clearance with the various brake elements.

As shown in Figures 13 through 17, brake adjustment mounting member 274 is also an integrally cast member having a base 276 from which integral pins 278 and boss 280 depend. Upstanding housing 282 is provided with a pair of threaded bores 284 disposed approximately 120 degrees apart with respect to a vertical axis of Figure 13, for adjustably receiving threaded shanks 286 of hollow adjustment screws 288 having enlarged serrated heads 289. Abutment pins 290 are slidably mounted within bore 292 of screw 288 with inner shoulder 294 of enlarged bifurcated head 296 of each pin in slidable contact with an adjacent face of a screw head. Adjacent ends of brake shoe web 76 and actuating lever 124 are slidably rockably received between the arms of bifurcated head 296 as illustrated in Figure 15. Spring leaf ratchet lock 298 is mounted on an upstanding integral pin 300 and biased toward ratchet adjustment screw 288 to engage detent 302 between the ratchet teeth of screw head 289 and resiliently maintain the screw in its adjusted position.

As shown in Figures 13, 14 and 15, base 276 is mounted on surface 244 with pins 278 and boss 280 extending through holes 254 and 256 respectively, and pins 278 are shear riveted on the opposite side of backing plate 240 to securely and rigidly mount adjustment mounting 274 on the plate 240. In its mounted position on the backing plate, member 274 is so disposed that the axial adjustable travel of screws 288 is parallel to the longitudinal axis of access slots 257, so that from outside plate 240 a tool can be inserted through slots 257 to engage the teeth of the ratchet and adjustably rotate the screws to vary the relative clearance between the brake shoe linings and the drum.

Rotation of screw 288 in one direction will shift the associated abutment pin 290 outwardly. During rotation of screws 288 detents 302 will ratchet over head 289 until the desired brake adjustment is attained. During opposite rotation inward of screw 288, abutment pin 290 is shifted inwardly to maintain abutting contact of shoulder 294 and the head of screw 288 by the biasing force of brake return springs 148. Thus in both embodiments of the invention the abutments for the brake shoes and levers opposite the wedge actuator are individually shiftable to select a desired brake lining clearance with the drum.

Cover member 304 has a pair of spaced spring arms 306 which frictionally engage the sides of slot 257 as shown in Figures 15 and 16 to hold cover member 304 in covering relation over slots 259. Integrally formed upstanding projections 308 on the same side of cover member 304 as arms 306 engage the ends of slots 257 to properly locate the cover member with respect to the slots.

From the foregoing description it will be seen that there is herein provided a novel mechanically operated wholly enclosed expanding type brake, with equal self energizing of both brake shoes during both forward and reverse rotation of the brake drum, with a novel wedge actuating mechanism for applying equal braking force to each shoe, with novel adjustment means for individually adjusting each brake shoe, and composed of structurally simple parts all constituting a brake unit of relatively smaller size and greater efficiency than those in conventional use today. Shoes 68 are interchangeable between opposite sides of the assembly which reduces inventory and cuts manufacturing costs.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an internally expanding brake, a rotatable drum; a backing plate; brake shoes having curved ends and slidably mounted on said backing plate for selective movement into and out of engagement with said drum; actuating levers mounted side by side with the respective brake shoes and slidably rockably engaging said brake shoes to transmit braking force to said brake shoes; adjustment means engaging adjacent ends of both said actuating levers and brake shoes for individually moving said brake shoes and associated levers to adjust the clearance between said brake shoes and drum; said levers having adjacent converging faces at their ends opposite said adjustment means; wedge means operatively engaging said adjacent converging faces of said actuating levers for transmitting braking force to said levers having automatic self-aligning means to tilt said wedge means and compensate for any unequal clearance of said levers whereby equal braking force is always transmitted to each of said levers; a lever operatively engaging said wedge means to move said wedge means and levers whereby said brake shoes are moved into engagement with said drum; and spring means operatively connected to each brake shoe and said backing plate for holding said shoes and levers in engagement with said adjustment means and for moving said shoes out of engagement with said drum.

2. In a vehicle brake assembly, a backing plate having a plurality of flat support surfaces lying substantially in a plane; a pair of brake shoes slidable on one side over said support surfaces and having intermediate webs; substantially diametrically opposed sets of abutments on said backing plate for engaging opposite ends of said webs; a pair of actuating levers slidable on the side of said webs facing away from the backing plate and abutting in fulcrumed relation at adjacent ends of one set of abutments; a rigid lateral projection on each of said actuating levers slidably rockably engaging the associated brake shoe substantially midway between said abutments; retaining means disposed on said one set of abutments at an adjacent end of said brake shoes and levers retaining said shoes and levers in relatively slidable assembly; actuating means engaging said levers at their other ends and shiftable toward said retaining means for transmitting braking force to said levers; return springs anchored at one end to said backing plate and at their other ends to said shoes opposing said actuating means and urging said shoes against said supports and abutments; and means for moving said actuating means to apply and release said brakes.

3. In brake mechanism, a support plate, means on said support providing a first flat slide face, a flat brake lever pivotally mounted at one end on said plate with its bottom surface adjacent the other end slidably supported on said slide face, a brake shoe rockably and slidably associated with said lever intermediate its ends and having a flat web disposed between the lever and support and slidably engaging the bottom surface of said lever, a second slide face on said plate parallel to said first slide face but at a different level from said first slide face, said brake shoe having an arcuate lining platform formed along one side edge with a flat surface adapted to engage and move along said second slide face, and a brake return tension spring connected between said shoe and the support disposed at an angle to said slide faces, whereby said spring not only urges said shoe and lever assembly toward retracted position in a direction parallel to said slide faces but it urges said lever and shoe surfaces toward the support and against the associated slide faces.

4. A brake shoe comprising an arcuate platform having a lining secured thereupon, a web projecting inwardly from said platform, said web having identically shaped rounded abutment contacting ends and having on its inner periphery at least one rigid convex surface fulcrum projection adapted for rocking engagement by a brake actuating lever, and means on said platform enabling a circumferentially floating slide connection with the brake actuating lever.

5. A brake shoe as defined in claim 4, wherein said means on said platform is an arcuate circumferential disposed slot overlapping both sides of said web enabling interchangability and reversibility of brake shoes.

6. A brake shoe as defined in claim 5, wherein said slot is disposed nearer one end of the brake shoe than the other end, said brake shoe web inner periphery has at least two rigid spaced apart convex surface fulcrum projections, and a spring anchor means is essentially centrally disposed on said brake shoe.

7. In a brake mechanism, a support, means on said support providing a first slide face, a brake lever pivotally mounted at one end on said support with its bottom surface adjacent the other end slidably supported on said slide face, a brake shoe rockably and slidably associated with said lever intermediate its ends and having a web disposed between the lever and support and slidably engaging the bottom surface of said lever, a second slide face on said plate parallel to said first slide face at a different level from said first slide face, said brake shoe having a lining platform formed along one side edge with a surface adapted to engage and move along said second slide face, and a spring connected between said shoe and the support disposed at an angle to said slide faces, whereby said spring urges said shoe and lever assembly toward retracted position in a direction parallel to said slide faces and also urges said lever and shoe surfaces toward the support and against the associated slide faces.

8. For use in a brake assembly consisting of a brake shoe and an actuating lever rockably and slidably connected thereto, said actuating lever comprising a flat elongated member formed at one end with a pivot rock face and at its other end with a smooth actuator wedge engaging face, a radial outward projection on said member for engaging a brake shoe platform, and a radially outwardly facing rigid abutment surface on said member adjacent its inner edge.

9. In a brake wherein two brake shoe assemblies are pivoted at adjacent ends on a support, a wedge actuator mounted between the other ends of said shoe assemblies and formed with a slotted opening having convex side edges, and a control lever intermediately pivoted on said support on an axis normal to said pivots and having an end slidably received within said slotted opening, said convex side edges of said slotted opening enabling limited pivotal movement of said wedge actuator on said control lever end.

References Cited in the file of this patent

UNITED STATES PATENTS

| | | |
|---|---|---|
| 1,092,342 | Culver et al. | Apr. 7, 1914 |
| 1,629,746 | Sprung | May 24, 1927 |
| 1,860,959 | Schnell | May 31, 1932 |
| 1,901,662 | Mahoney | Mar. 14, 1933 |
| 1,933,671 | Keese | Nov. 7, 1933 |
| 2,046,806 | Baum et al. | July 7, 1936 |
| 2,051,088 | Kittle et al. | Aug. 18, 1936 |
| 2,064,575 | Taylor | Dec. 15, 1936 |
| 2,115,961 | Main et al. | May 3, 1938 |
| 2,116,174 | Kay | May 3, 1938 |
| 2,136,470 | Sawtelle | Nov. 15, 1938 |
| 2,149,614 | Main et al. | Mar. 7, 1939 |
| 2,176,204 | Caya | Oct. 17, 1939 |
| 2,181,022 | Main | Nov. 21, 1939 |
| 2,435,955 | Buckendale et al. | Feb. 17, 1948 |
| 2,454,271 | Buckendale et al. | Nov. 23, 1948 |
| 2,633,939 | Dodge | Apr. 7, 1953 |
| 2,709,505 | Dodge | May 31, 1955 |
| 2,751,048 | Super et al. | June 19, 1956 |

FOREIGN PATENTS

| | | |
|---|---|---|
| 552,174 | Great Britain | Mar. 25, 1943 |

UNITED STATES PATENT OFFICE
CERTIFICATE OF CORRECTION

Patent No. 2,912,068                                  November 10, 1959

Bryan E. House

It is hereby certified that error appears in the printed specification of the above numbered patent requiring correction and that the said Letters Patent should read as corrected below.

Column 7, line 52, before "linings" insert -- the --; line 69, for "self-energizing" read -- self-energized --; column 10, line 65, before "brake" insert -- a --; column 11, line 24, for "periphary" read -- periphery --.

Signed and sealed this 3rd day of May 1960.

(SEAL)
Attest:

KARL H. AXLINE                                                    ROBERT C. WATSON
Attesting Officer                                            Commissioner of Patents